United States Patent [19]

Highsmith

[11] Patent Number: 4,496,061
[45] Date of Patent: Jan. 29, 1985

[54] CONNECTOR MEANS FOR SECURING SLOTTED MEMBERS

[75] Inventor: Charles E. Highsmith, Springfield, Tenn.

[73] Assignee: Unarco Industries, Inc., Chicago, Ill.

[21] Appl. No.: 195,656

[22] Filed: Oct. 9, 1980

[51] Int. Cl.$^3$ ............................................. B01D 23/24
[52] U.S. Cl. .................................. 211/191; 211/192; 411/401; 411/378
[58] Field of Search ............... 211/191, 192, 182, 187; 29/526 R; 411/401, 349, 187, 188, 378, 188, 411/185, 424, 277

[56] References Cited

U.S. PATENT DOCUMENTS

| | | | |
|---|---|---|---|
| 1,803,431 | 5/1931 | Hill | 411/439 |
| 2,388,467 | 11/1945 | Cole | 411/277 X |
| 2,923,339 | 2/1960 | Skidmore | 411/277 |
| 3,078,899 | 2/1963 | Maclean et al. | 411/185 |
| 3,512,653 | 5/1970 | Erisman | 211/192 |
| 3,877,579 | 4/1975 | Weider | 211/192 |
| 3,928,905 | 12/1975 | Atwater | 29/526 R X |
| 4,223,711 | 9/1980 | Tabor | 411/188 |
| 4,254,542 | 3/1981 | Craig | 29/526 R X |

FOREIGN PATENT DOCUMENTS

| | | | |
|---|---|---|---|
| 402883 | of 1920 | Australia | 211/191 |
| 2628324 | 1/1977 | Fed. Rep. of Germany | 411/401 |
| 1069702 | 5/1967 | United Kingdom | 411/401 |

Primary Examiner—Ramon S. Britts
Assistant Examiner—Robert W. Gibson, Jr.
Attorney, Agent, or Firm—Clement and Ryan

[57] ABSTRACT

A T-shaped bolt for use in securing two slotted members—such as an upright post and a horizontal beam in a pallet storage rack—to each other. The tee head of the bolt is dimensioned to be inserted in a pair of aligned slots of the two members that are to be secured to each other, and then rotated so that the ends of the tee head abut edge portions of the slot in the first slotted member, with the threaded shank of the bolt extending out through the slot in the second slotted member. The nut to be threaded on the bolt is a torque resistant nut, and thus when it is first turned it will cause the bolt to rotate until its specially shaped neck abuts the edges of one or both slots. At this point, the application of a predetermined minimum torque causes the nut to be turned further upon the bolt, until it is turned up tight against the second member and secures the two slotted members to each other.

15 Claims, 44 Drawing Figures

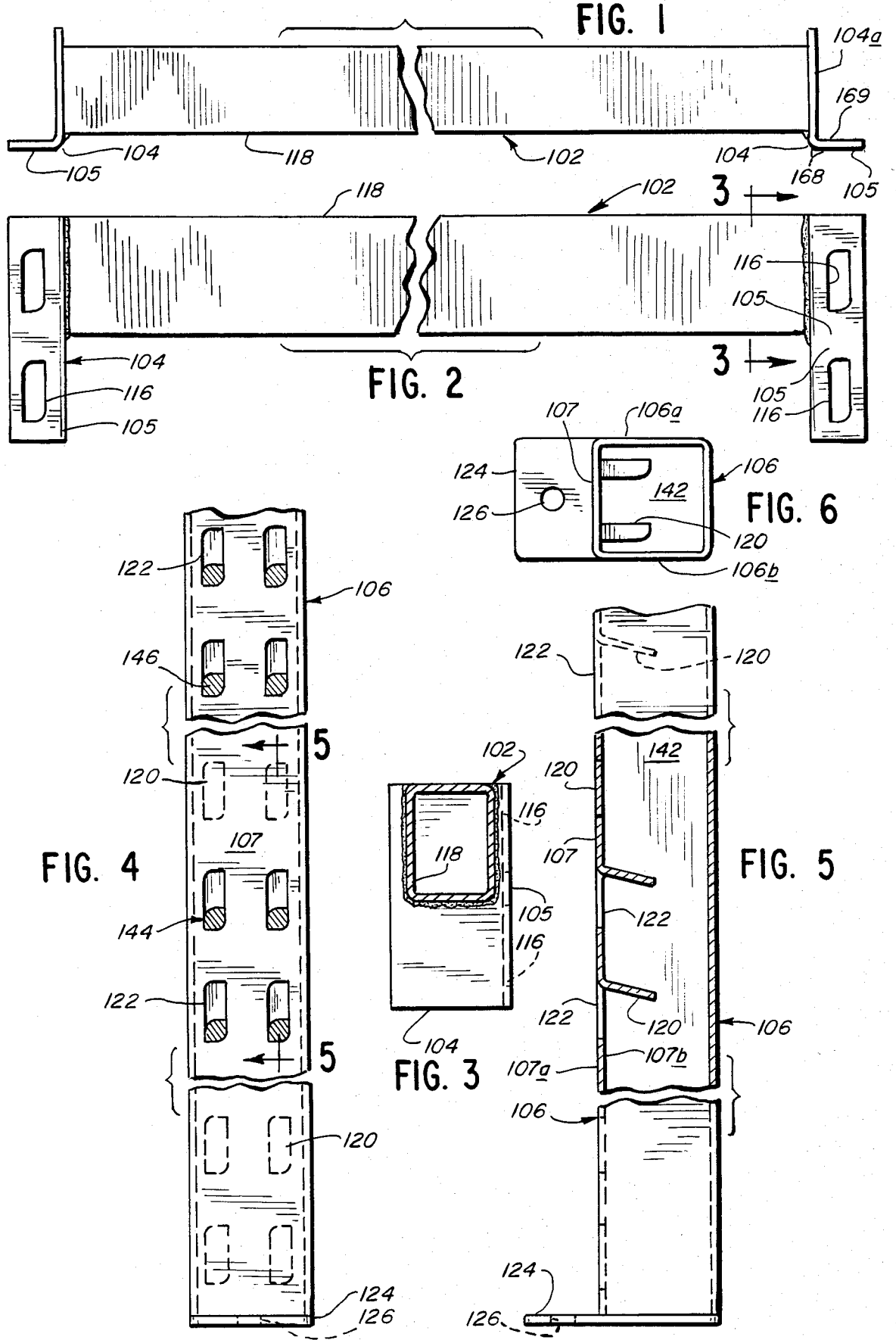

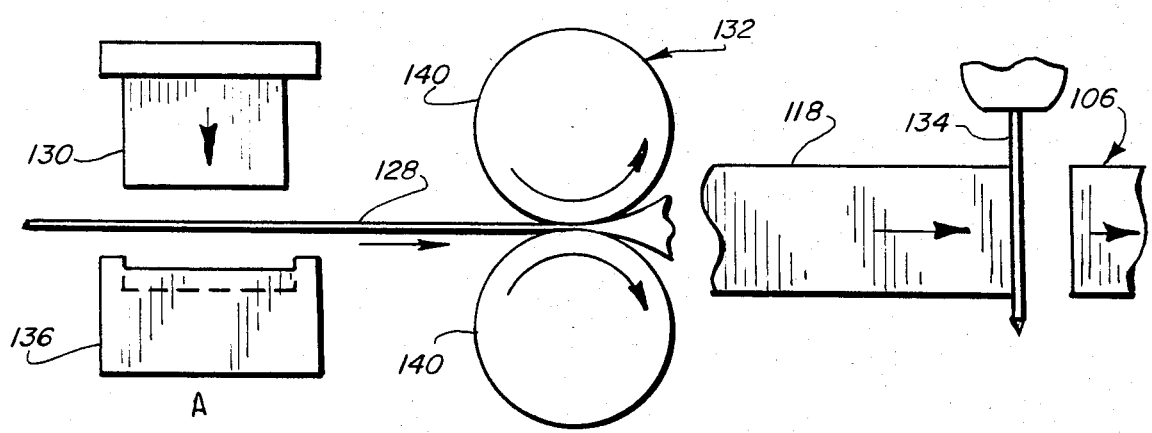
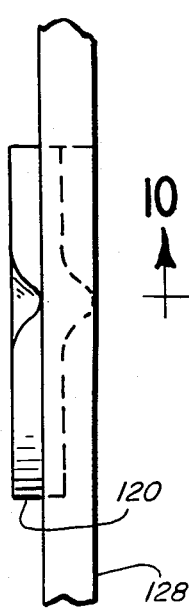
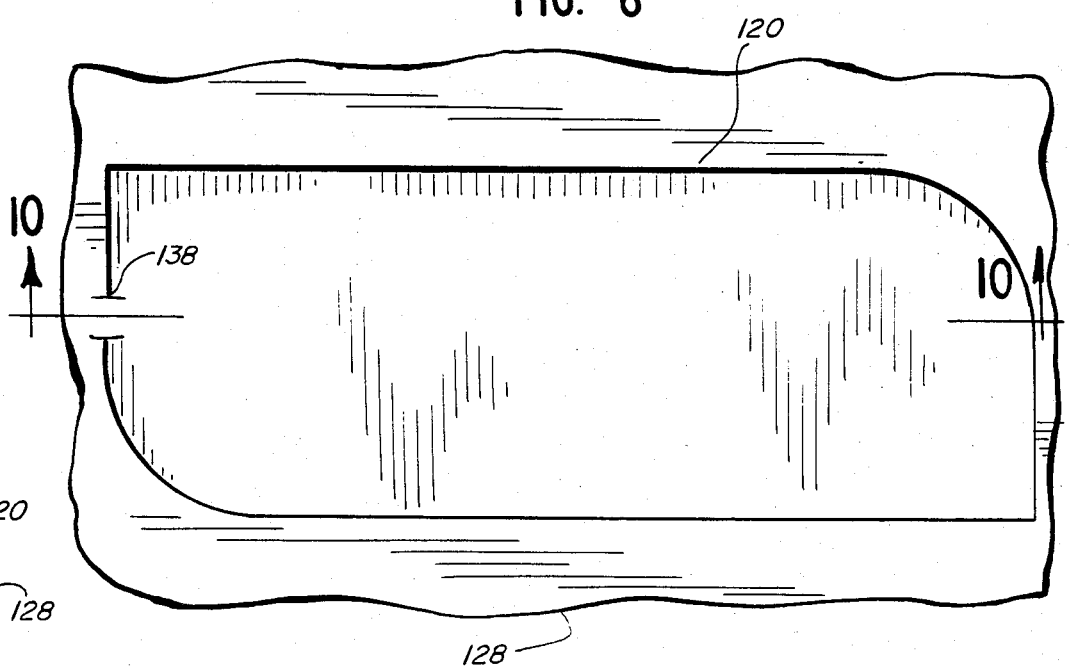
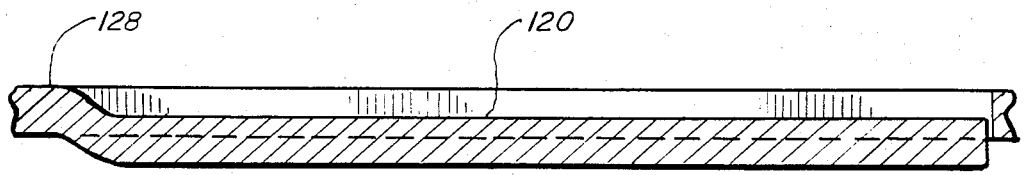
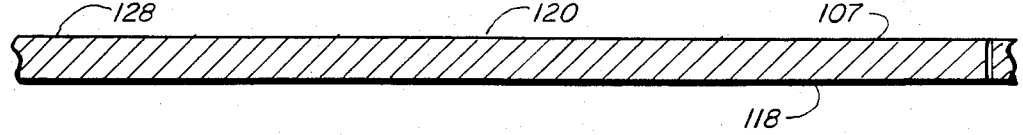

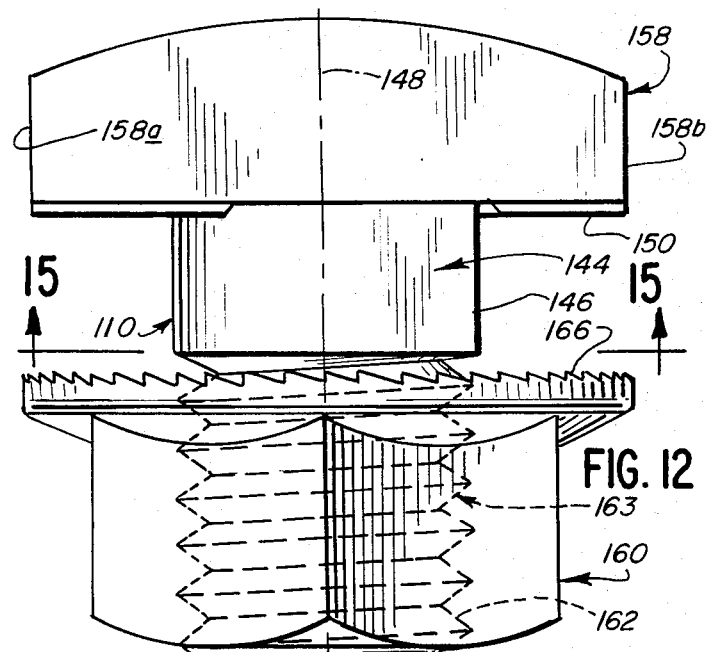
FIG. 12
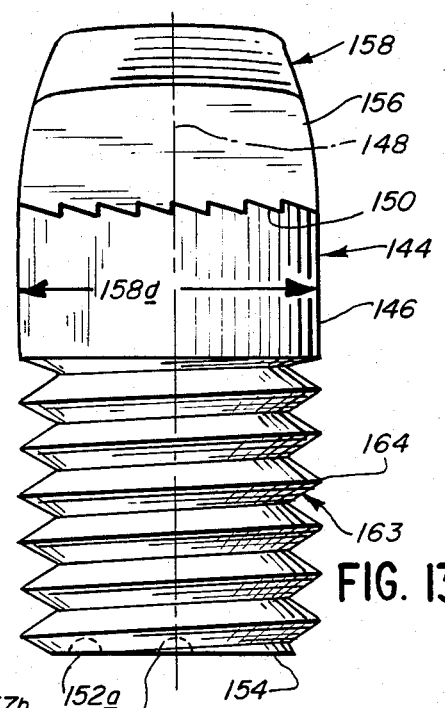
FIG. 13
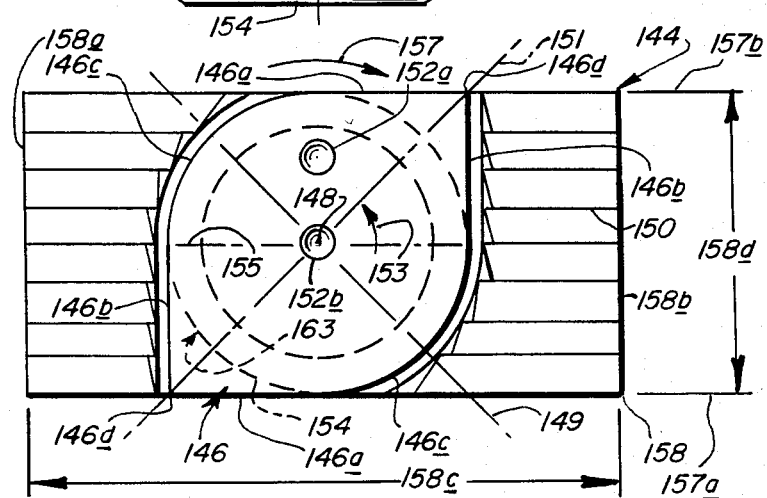
FIG. 14
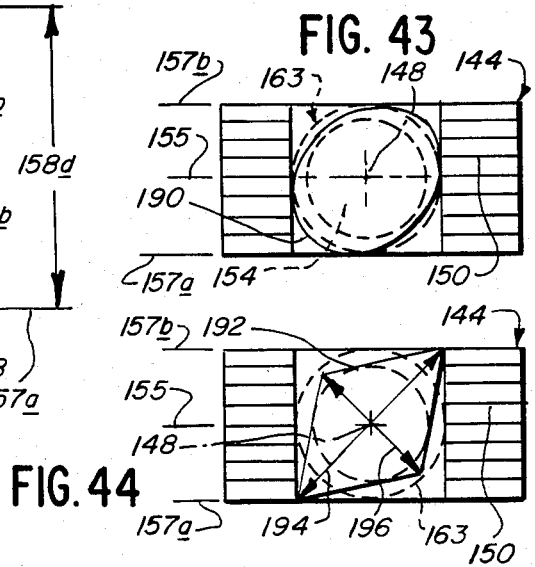
FIG. 43
FIG. 44
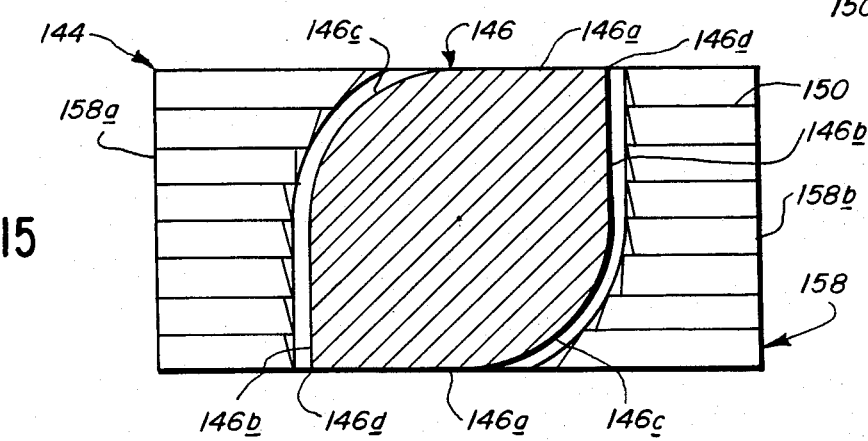
FIG. 15

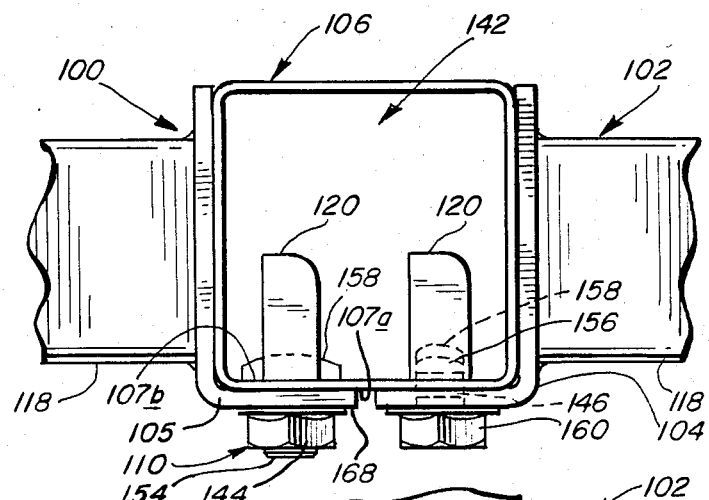
FIG. 16
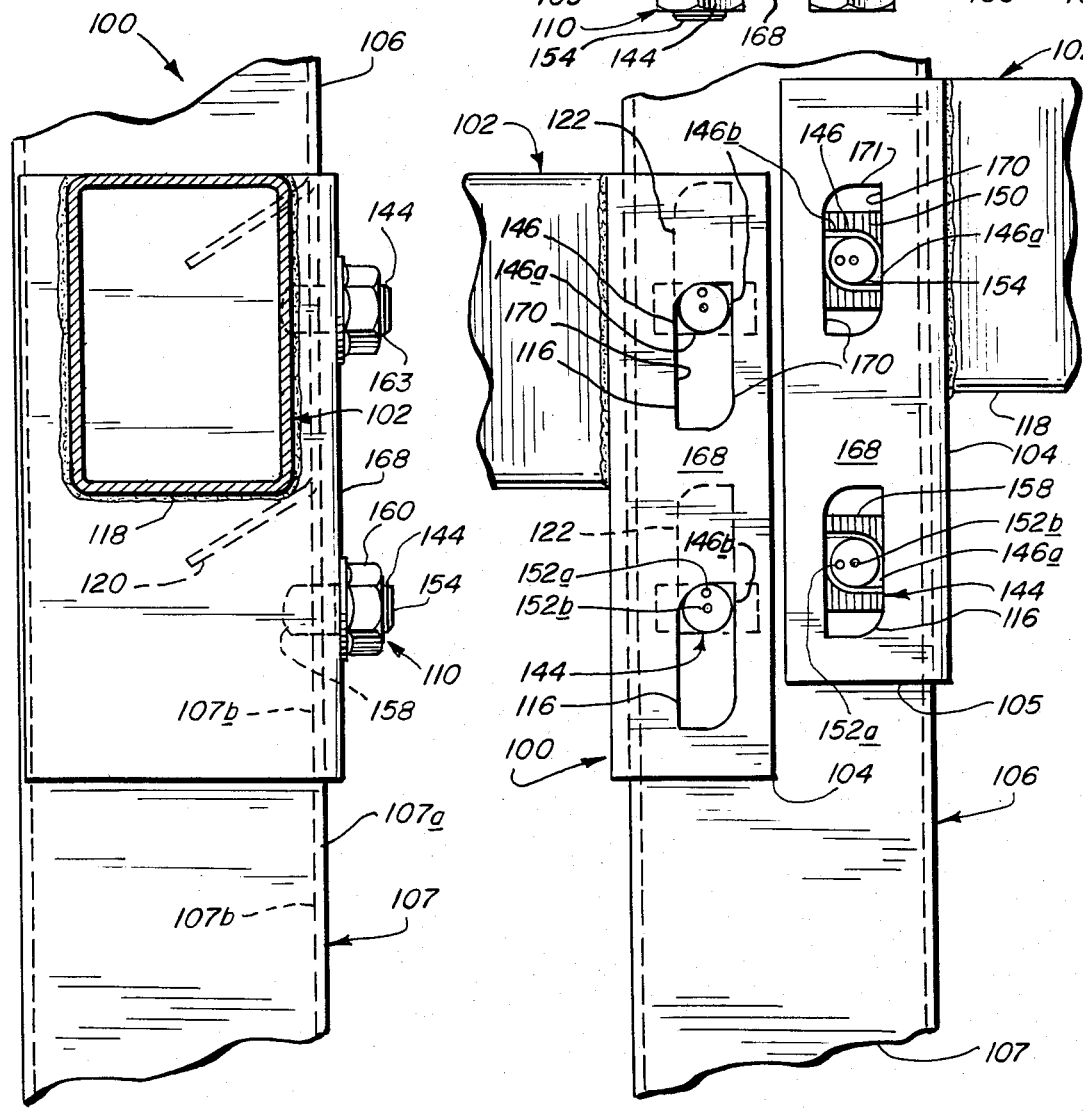
FIG. 17
FIG. 18

FIG. 20 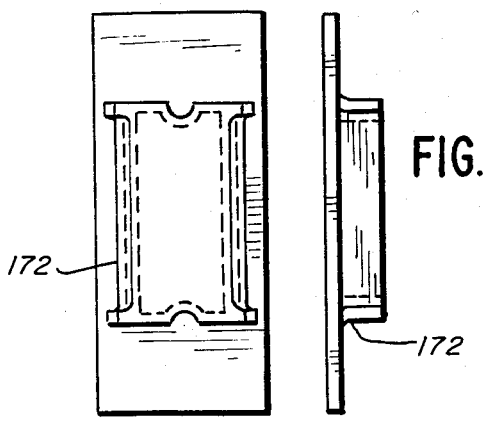 FIG. 24 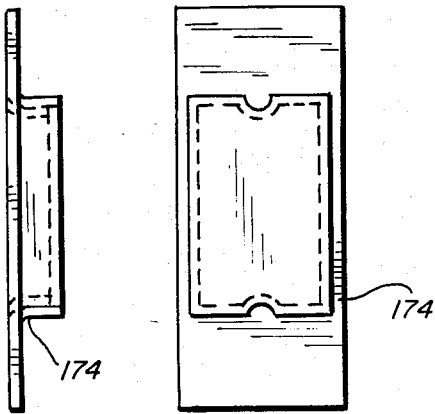
FIG. 22
FIG. 26
 
FIG. 21
FIG. 25
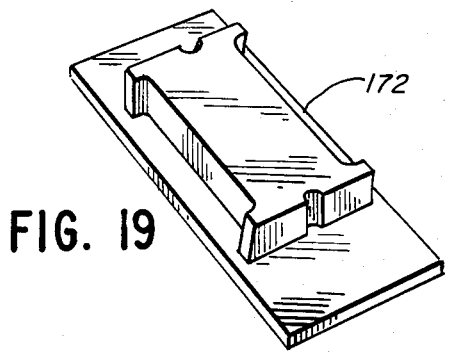

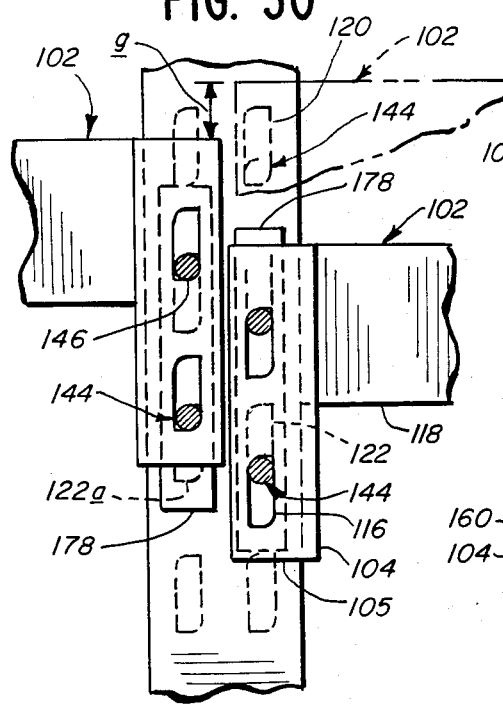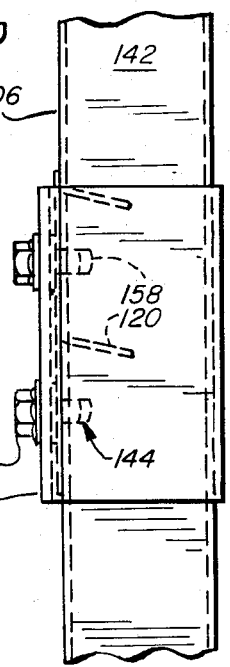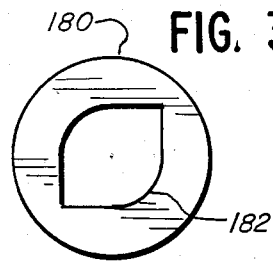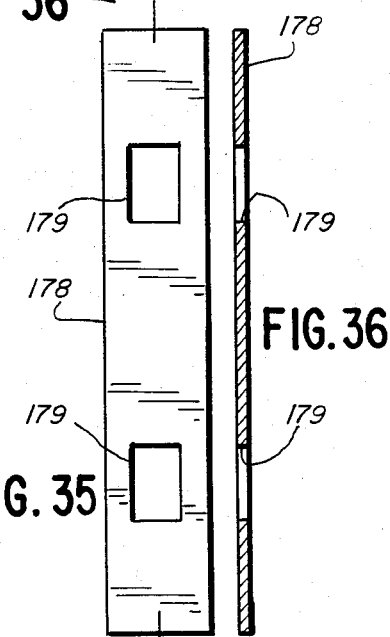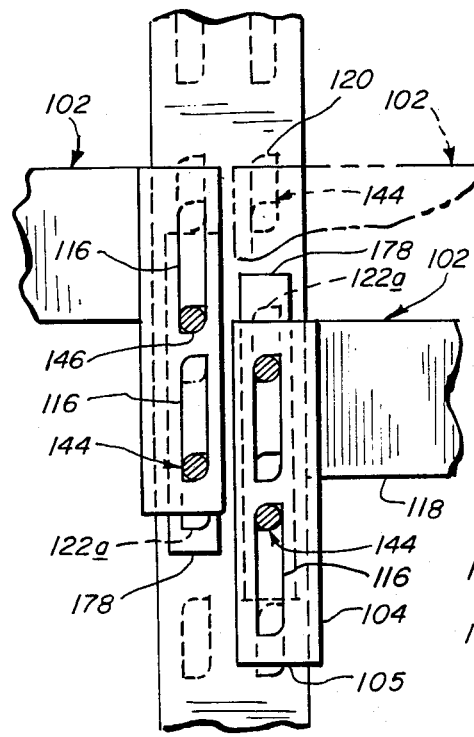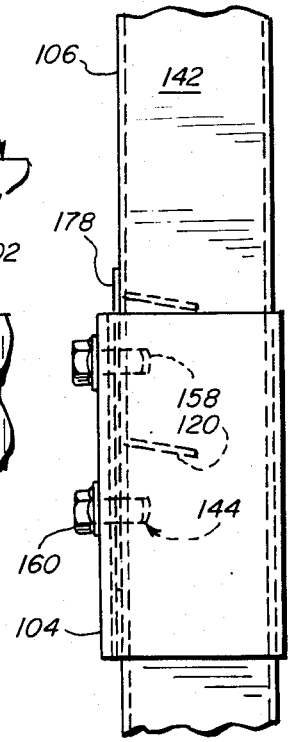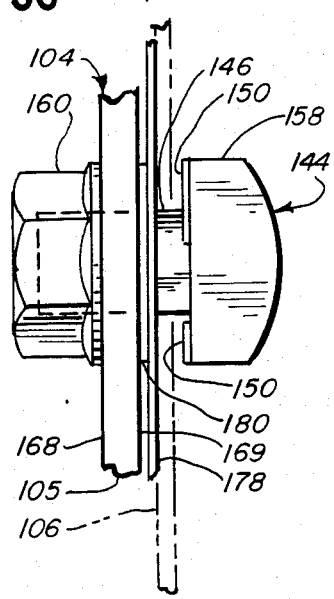

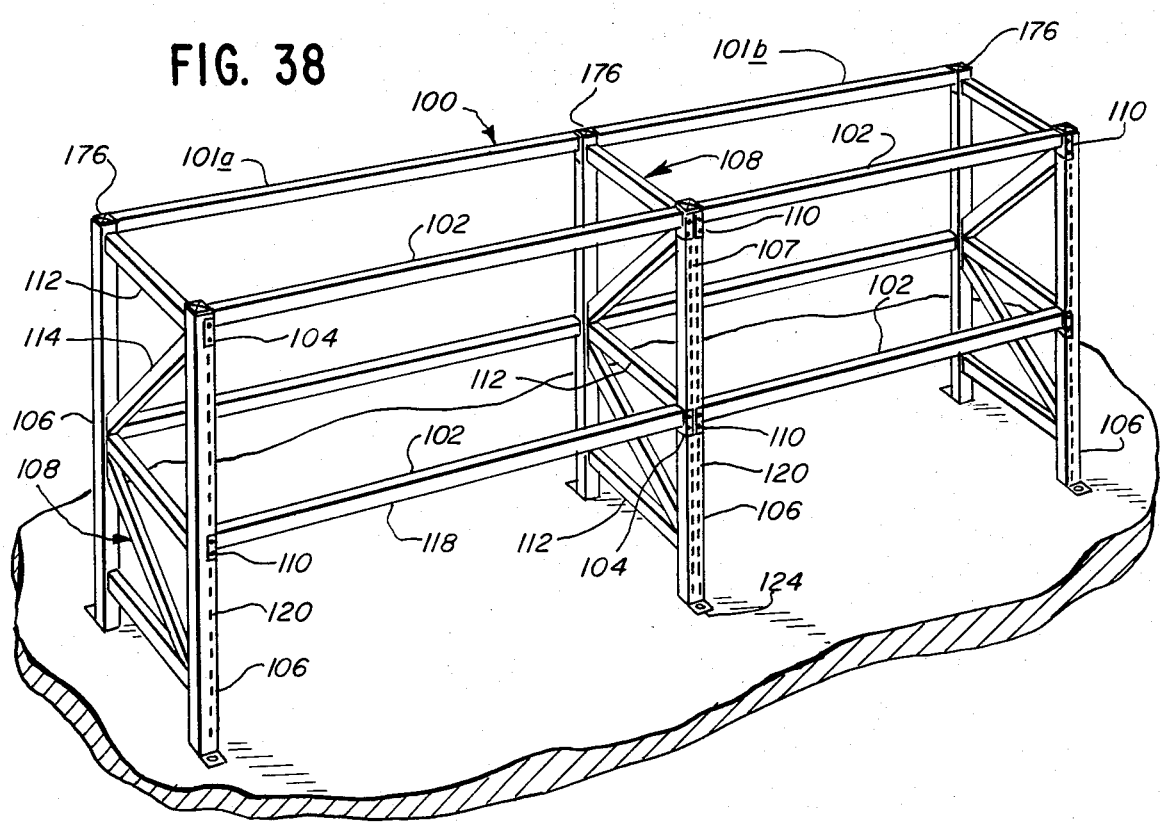
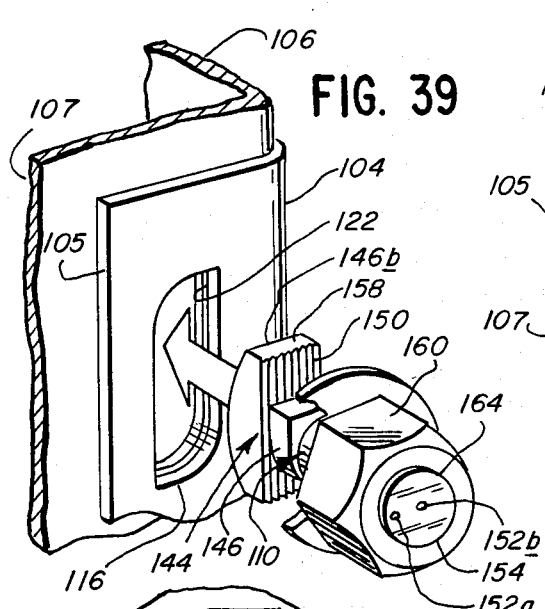
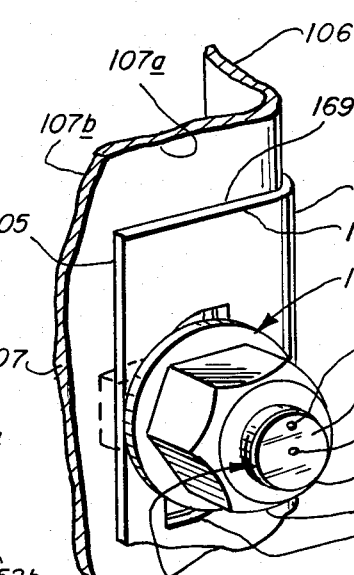
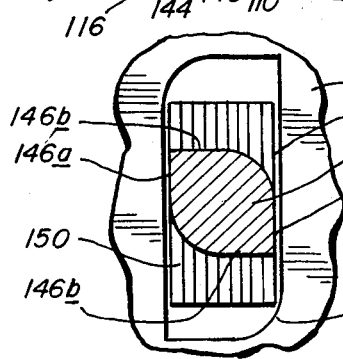
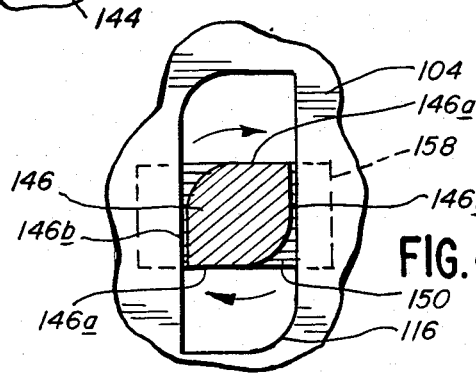

CONNECTOR MEANS FOR SECURING SLOTTED MEMBERS

BACKGROUND OF THE INVENTION

This invention relates to a T-shaped bolt, and more particularly to such a bolt that is useful for securing two slotted members together.

Threaded connector bolts have been commonly used to secure two slotted members by aligning the slots of the members, inserting the bolt in the aligned slots, and turning an internally threaded nut on the bolt to tighten the nut and the bolt. This requires that there be access to the exposed faces of each slotted member so that both the bolt and the nut can be reached for positioning and tightening either manually or by use of suitable power tools.

With the novel connector means of this invention, two slotted members may be secured together even though access can be had only to the exposed face of one member. Thus, the connector means is especially useful in securing the slotted flange of the angle at the end of the horizontal beam to the slotted upright post of a conventional storage rack, even in those situations in which the post is a closed tubular post and thus the inner face of the post wall is completely out of reach.

The connector means of this invention is useful for securing any two slotted members together, whatever the structure in which the members are incorporated. It is useful even when both the front and rear slotted members are accessible, for it has been found that the connector bolt of this invention can be positioned and tightened much faster than a conventional bolt and nut, especially when power tools are employed.

As already indicated, this invention has particular application in the case of storage racks that are comprised primarily of closed tubular posts and beams. One storage rack of this type is one in which there are no openings in the erected structure which can permit the accumulation of foreign material within the posts and beams. The invention is described in this specification in terms of a specially designed storage rack of this general type.

The definitions of the following parts and components of storage racks are applicable throughout this application and the appended claims:

Upright—A welded load-carrying frame comprising posts, diagonals and horizontal connecting members.

Post—A slotted, columnar structure member which transmits loads from horizontal beams, etc., to a supporting surface such as a floor.

Beam—Horizontal beam, supporting bar, or shelf beam, frequently of tubular construction, with angles welded to each end.

Angle—Slotted, formed angle welded to a beam member.

Connection—Means for securing beams to posts for transmission of loads.

SUMMARY OF THE INVENTION

This invention provides a T-shaped bolt having a neck of a particular cross section that makes it especially adapted for use in securing two slotted members together in storage racks or other structures.

The bolt of this invention has a tee head and an elongated threaded shank that has a longitudinal axis and a terminal end located opposite the tee head, with a neck positioned between and connecting the shank and the tee head.

The tee head has portions that extend laterally outwardly of the neck for a predetermined total length, and has a substantially smaller width. The outwardly extending portions of the tee head preferably extend in opposite directions from the neck of the bolt. The tee head preferably has an underside with serrations that are harder than the member to which it is intended to be connected in use.

The cross section of the bolt neck normal to the longitudinal axis of the bolt shank has a maximum length measured in a first direction intersecting the shank axis, and a substantially smaller maximum width measured in a second direction also intersecting said shank axis but normal to said first direction. The angle from the longitudinal axis of the tee head to the first direction just referred to is an acute angle when said angle is measured in the angular direction opposite to the direction of the shank thread. Finally, the distance between the two planes parallel to the longitudinal axis of the tee head and tangent to the bolt neck cross section is substantially less than the tee head length and preferably no greater than the tee head width.

The preferred form of bolt neck cross section in the product of this invention is a semi-square cross section. In this specification and claims, the term "semi-square" is used to describe a member whose cross section has four sides of generally equal length, the opposite sides of the cross section being parallel to each other, and the four sides intersecting to form one set of diagonally opposite corners each of which is arcuate, and another set of diagonally opposite square corners. The arcuate corners have substantially the same curvature, and the semi-square neck thus has a generally lenticular cross section that is symmetrical along a line bisecting either set of diagonally opposite corners.

In addition to the preferred embodiment of the bolt of the invention, which has a neck with a semi-square cross section, the T-shaped bolt of this invention may have a cross section of any other shape and orientation that meets the required dimensions and orientation outlined above. Thus, for example, the bolt neck cross section of properly oriented may be, if desired, elliptical in shape, or diamond-shaped with one diagonal longer than the other.

Use of the preferred semi-square neck bolt of this invention in the assembling of a pallet storage rack is described in detail below. In such use the member, such as the angle or post, to which the semi-square neck bolt is connected has at least one slot, preferably semi-rectangular in shape, for receiving the bolt. In this specification and claims, the term "semi-rectangular" is used to describe a shape that has four sides that include one pair of elongated parallel sides that are substantially longer than the sides of the cross section of the semi-square neck of the bolt, and one pair of parallel sides that are of generally the same length as, or slightly wider than, the sides of the cross section of the semi-square neck. The end of each semirectangular slot, as that term is used herein, is in addition generally complementary in shape to three sides of the cross section of the semi-square neck of the T-shaped bolt.

In the illustrative pallet storage rack in which the bolt of this invention is used as described below in this specification, the elongated sides of the slot are spaced apart from each other a distance substantially less than the maximum length of the outwardly extending portions of the tee head and substantially less than the thickness of the semi-square neck measured between the diagonally opposite square corners of the semi-square neck, but greater than the width of the tee head and greater than the distance between the two planes parallel to the longitudinal axis of the tee head and tangent to the bolt neck cross section, to slidably receive the semi-square neck during insertion of the bolt and to abuttingly receive the semi-square neck when the tee head is rotated about 90°. The opposite edges of the slots and the neck have surfaces that seat with each other after the tee head is rotated, to substantially prevent the bolt from thereafter rotating when the nut is subsequently tightened on the threads of the bolt.

Besides the connector bolt itself, this invention encompasses the combination of the bolt with an internally threaded nut that is manually threadable for a distance upon the threaded shank of the bolt and resists further threading upon said shank except under application of a torque of at least a predetermined magnitude. In one such nut, the threads of the nut are deformed in the portion of the nut that is farthest from the tee head when the nut is initially threaded upon the bolt shank. Another such nut is one in which the inner diameter of the nut decreases from one face of the nut to the other. Still another nut that may be used in this invention is a lock nut.

The illustrative storage rack described in this specification may be assembled by positioning each beam horizontally and placing the outer flange of the angle against the outer face of the post so that the slots of the angle are aligned in registration with the slots of the post. The nut and bolt are preassembled before the tee head is inserted into the set of aligned slots, by turning the nut on the threads of the bolt so that the nut is spaced away from the tee head an amount greater than the combined thickness of the outer flange of the angle and the outer wall of the post. The tee head of the preassembled nut and bolt assembly is then inserted into one set of aligned slots of the angle and post until the tee head is positioned just inside the post.

The tee head bolt is then rotated so that the extending portions of the tee head are generally transverse to the opposite edges of the slots. At this juncture the neck is seated against the opposite edges of the set of aligned slots so that the neck and the edges of the slots are in abutting engagement with each other—while the extending portions of the tee head are generally transverse to the opposite edges of the slots—to substantially prevent the bolt from thereafter rotating as the nut is subsequently tightened. The nut is tightened on the bolt until the angle is secured to the post.

The neck of the T-shaped bolt of this invention is preferably no longer than the combined thickness of the post and angle flange with which the bolt is used, so that when the nut is tightened upon the threaded shank of the bolt it can advance until it is snug against the outer face of the angle flange. If this relationship between the neck length and the combined post and angle flange thickness is not maintained, it is necessary to use washers to permit the nut to advance to the point where it can be turned far enough that the angle flange is tightly secured against the upright post.

In the preferred embodiment of the connector bolt of this invention, the terminal end of the shank has orientation marks thereon. The orientation marks are first positioned to indicate a bolt-inserting position before the tee head is inserted in the slots. After the tee head is inserted in the slots, the shank is rotated about 90° until the orientation marks are moved to a tee head-locking position, in which the extending portions of the tee head are positioned transverse to the opposite edges of the slots, before tightening the nut.

As indicated above, in addition to its use in the assembly of a storage rack as described, the novel connecting means of this invention is useful whenever any two slotted members are to be attached to each other, and is especially useful when one of the members is positioned behind the other with its far side out of reach of the person who is attaching the two members to each other. Whatever the two members to be attached may be, the bolt of this invention can be inserted and turned in the aligned slots of the two members until the bolt neck abuts the slot edges so that the tee head is held against rotation when the nut is tightened upon the bolt.

A more detailed explanation of the invention is provided in the following description and appended claims taken in conjunction with the accompanying drawings.

BRIEF DESCRIPTION OF THE DRAWINGS

FIG. 1 is a broken top plan view of a beam of a pallet storage rack;

FIG. 2 is a broken front view of the same beam;

FIG. 3 is a cross-sectional view of the beam taken substantially along line 3—3 of FIG. 2;

FIG. 4 is a broken front view of a post of the storage rack with semi-square neck bolts, shown in cross-section, connected thereto;

FIG. 5 is a broken end view of the post, with a partial cross-section taken substantially along line 5—5 in FIG. 4, but with the bolts omitted for clarity;

FIG. 6 is a top plan view of the same post;

FIG. 7 is a diagrammatic, broken showing of a method for making posts of a storage rack having knockouts;

FIG. 8 is an enlarged front view of a knockout that can be made with the method of FIG. 7;

FIG. 9 is an end view of the knockout shown in FIG. 8, viewed from the left-hand end of that Figure, after the knockout has been sheared and partially displaced by a pre-punch press, preparatory to being advanced through the first set of forming rolls of a continuous tube-forming mill;

FIG. 10 is a cross-sectional side view of the knockout of FIG. 8, taken along line 10—10 in that Figure;

FIG. 11 is a cross-sectional side view of the knockout shown in FIG. 10 after it has been advanced through the first set of forming rolls of the continuous tube-forming mill;

FIG. 12 is an enlarged front view of a nut and bolt assembly in which the T-shaped bolt has a semi-square neck;

FIG. 13 is a side view, from the right-hand side of FIG. 12, of the semi-square neck bolt shown in that Figure;

FIG. 14 is a bottom plan view of the semi-square neck bolt of FIG. 13, with the threaded shank of the bolt shown in phantom;

FIG. 15 is a cross-sectional bottom view of the semi-square neck bolt taken along line 15—15 of FIG. 12;

FIG. 16 is a top plan view of a post and portions of two beams of the illustrative storage rack, with the bolt on the right-hand side having been inserted through the slots of the angle and post preparatory to being rotated and tightened, and illustrating the bolt on the left-hand side after it has been rotated and the nut tightened thereon;

FIG. 17 is a fragmentary end view of the portions of the storage rack shown in FIG. 16 from the left-hand side of the latter Figure;

FIG. 18 is a fragmentary front view of the portions of the storage rack shown in FIG. 16, with the beam on the left-hand side seated in place and the other beam being moved into place, and with the nuts omitted for clarity;

FIG. 19 is a perspective view of a plug for a slot in an upright tubular post of a pallet storage rack;

FIG. 20 is a front view of the plug of FIG. 19;

FIG. 21 is an end view of the same plug;

FIG. 22 is a side view of the same plug;

FIG. 24 is a front view of the plug of FIG. 23;

FIG. 25 is an end view of the same plug;

FIG. 26 is a side view of the same plug;

FIG. 29 is a front view of the same plug;

FIG. 30 is a broken front view of portions of a pallet storage rack in which the slots of the angles have the same vertical length as the slots of the associated posts;

FIG. 31 is an end view of the portions of the storage rack shown in FIG. 30 with part of the beam omitted for clarity;

FIG. 32 illustrates portions of another pallet storage rack in which the slots of the angles are longer than the slots of the associated posts;

FIG. 33 is an end view of the portions of the storage rack shown in FIG. 32 with part of the beam omitted for clarity;

FIG. 34 is an enlarged front view of a washer for use in the nut and bolt assemblies of FIGS. 30-33;

FIG. 35 is an enlarged front view of a cover member for use in the bolt assemblies of FIGS. 30-33;

FIG. 36 is a cross-sectional view of the cover member taken along line 36—36 of FIG. 35;

FIG. 37 is an enlarged view of the bolt assembly used in FIGS. 30-33;

FIG. 38 is a perspective view of a pallet storage rack;

FIG. 39 is an enlarged, exploded, perspective view of portions of the pallet storage rack depicting the preassembled nut and bolt assembly preparatory to being inserted through the slots of the angle and post;

FIG. 40 is a cross-sectional view of the preassembled nut and bolt assembly shown in FIG. 39, taken along a plane normal to the longitudinal axis of the bolt, after the assembly has been inserted in the slots of the angle and post;

FIG. 41 is a view similar to FIG. 39 but illustrating the preassembled nut and bolt assembly after the bolt has been rotated and the nut tightened thereon;

FIG. 42 is a cross-sectional view, taken along the plane of the front face of the beam angle, of the bolt assembly shown in FIG. 41;

FIG. 43 (on the sheet with FIGS. 12-15) is similar to FIG. 14 but on a smaller scale, and shows a connector bolt having a neck with a cross section of elliptical shape; and FIG. 44 is similar to FIG. 43 and shows a bolt having a neck cross section of diamond shape, with one diagonal longer than the other.

DETAILED DESCRIPTION OF THE ILLUSTRATIVE EMBODIMENTS

Figure 27:
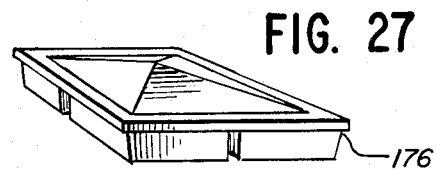
FIG. 27 is a perspective view of a post top plug.

For convenience and ease of understanding, FIG. 38 of the drawings will be discussed first.

FIG. 38 illustrates a pallet storage rack 100 having a pair of adjacent storage rack sections (modules) 101a and 101b, respectively, connected in an end-to-end array by nut and bolt assemblies 110. Pallet storage rack 100 is particularly useful for supporting load-carrying pallets, which may be inserted and removed from the storage rack via a forklift truck. Storage rack 100 can also be useful for carrying other articles and loads.

Pallet storage rack 100 has a plurality of generally horizontal load-carrying tubular beams 102 with horizontally opposed symmetrical angle portions or angles 104 welded to the ends thereof. Angles 104 are connected to a plurality of upright closed tubular posts 106 of upright frames 108 by nut and bolt assemblies 110. Each upright frame 108 has a plurality of horizontal connecting members or crossbars 112, extending transversely between and interconnecting a pair of posts 106, and one or more diagonal braces 114 which provide additional lateral support for the storage rack 100. The parts of the storage rack 100 are preferably made of metal such as steel. In some circumstances it may also be desirable to mount supplementary horizontal crossbars, or a metal deck or fork entry bars upon the beams 102, to provide further support for the load.

FIGS. 1-3 show beam 102 which includes punched and formed angles 104 which have slots 116 and are welded to a closed (welded seam) tubular member 118.

In the illustrative embodiment, each angle 104 has an abutment portion 104a, which extends transversely to the length of and closes beam 102, and has an outer flange 105 that extends longitudinally away from the beam in a direction generally along the length of the beam. Abutment portion 104a abuts against one of end faces 106a or 106b (FIG. 6) of tubular post 106. The outer flange has an inwardly facing flange surface 169, positioned against outer wall 107 of tubular post 106, and has an outer flange surface 168 that faces away from post 106. Outer flange 105 has two slots 116, preferably semi-rectangular in shape, which are in vertical alignment with each other. Slots 116 are aligned in registration with two post slots 122 (FIGS. 4 and 5), also preferably semi-rectangular in shape. A more detailed explanation of the semi-rectangular configuration as used in connection with slots 116 and 122 and knockouts 120 is explained below. If desired, the slots and knockouts may simply be rectangular in shape.

FIGS. 4-6 show post 106 which is a closed (welded seam) tubular member provided with knockouts 120 so that slots 122 can be opened by pushing the knockouts 120 inwardly as shown. Depending on a number of variables, when pushed inward knockouts 120 may remain in the position shown in FIG. 5, or may break off and fall to the bottom 124 of post 106. Either condition is acceptable. Foot plate 124, having hole 126 for anchor bolting, is welded at the load bearing end of post 106.

Each tubular post 106 has a rectangular cross-section with an outer face or wall 107. Outer wall 107 has an outer surface 107a, which faces away from the post, and has an inner surface 107b, which partly bounds and faces the interior 142 of tubular post 106. Outer wall 107 is formed with slotdefining knockouts 120 that lie within the plane of the outer wall.

Post sections, i.e., posts having a predetermined length, may be made from a coil of metal 128 of suitable width in a single automatic line of equipment (FIG. 7). First the flat strip 128 of metal is fed through a prepunch press 130 and die 136 at station A, where it is sequentially sheared to form partially punched-out semi-rectangular knockouts 120 (FIGS. 8-10). During the punching operation, each knockout 120 is partially displaced from the strip 128 by controlling the depth of the punch stroke of the press, so that the entire length of the knockout is substantially displaced out of the plane of the flat strip in a direction generally towards die 136 by an amount less than the thickness of the strip. The partially displaced knockout is displaced in a direction towards what later becomes, during the forming operation, the interior 142 of the post 106, so that the knockout can be thereafter pushed into the interior of the post to provide the desired number of post slots 122. The partially displaced knockouts lie generally parallel to the plane of the flat strip 128.

Afterwards, the punched strip 128 is advanced to a post-forming station 132 such as a tube mill, where the strip is formed and welded into a closed tubular member 118 (continuous closed section). At station 132, the partially displaced knockout is pushed substantially back into the plane of strip 128 to its original presheared position as shown in FIG. 11 so that it will lie within what later becomes the outer wall 107 of the post. In the illustrative embodiment, the post-forming station includes a generally continuous tube-forming mill 132 with a first set of forming rolls 140 that push the knockouts back into the plane of the strip. The tube-forming mill also forms the closed tubular member 118 and welds the tubular member 118 along its seam.

The closed tubular member 118 is then advanced to a cutter 134 which cuts the tubular member to the desired length to provide posts 106.

FIGS. 8-10 illustrate the formation of knockout piece 120 in the flat strip material 128 for a post section 106 after the pre-punch operation and before the roll-forming operation. As commonly understood in the art, the openings in pre-punch die 136 are made as though a full slot shaped as knockout 120 were to be punched out, except that the punch edge is interrupted to provide an unsheared portion 138. The departure from the normal art lies in the control of the depth of the punch stroke so that knockout 120 is pushed out of its original position in the plane of the parent material 128 but is not fully displaced from the parent material. This is done, as discussed above, in order that knockout 120 can be pushed back into the parent material 128 (see FIG. 11) as it moves through the first set of forming rolls 140 (FIG. 7), and will remain essentially in the plane of the parent material in post section 106 as the punched strip is folded and welded (by conventional apparatus, not shown) into a continuous tubular section. Cut-off is performed by cutter 134 at a point lying between adjacent knockouts 120.

Posts 106 (FIG. 38) may or may not be welded with the other parts to make upright frames 108, but foot plates 124 are welded on in all the embodiments shown, thereby closing the bottom of the posts 106.

Slots 122 (FIG. 5) in posts 106 for a given installation may be made by pushing knockouts 120 into posts 106 at either the manufacturing site or at the erection site. FIGS. 4-6 illustrate a typical post 106 with selected slots 122 opened.

The section configuration of the posts 106 may be as needed to achieve the dimensions required and the load-carrying efficiencies desired. The only limitation is that sufficient interior room 142 must be allowed for the insertion and rotation of bolts 144.

FIGS. 12-15 show nut and bolt assemblies 110. Nut and bolt assemblies 110 provide detachable fastening means to connect angle 104 to tubular post 106. Each nut and bolt assembly 110 has an internally threaded nut 160, that is positioned against the outer flange surface 168 (FIG. 16) of angle 104, and a generally T-shaped bolt 144 with a tee head (T-head) 158 that is positioned within the interior 142 of tubular post 106. As shown in FIGS. 12-15, bolt 144 has an elongated threaded shank 163, that extends along a longitudinal axis 148 to receive nut 160, and has a semi-square neck 146 that is positioned between and connects shank 163 and tee head 158. The terminal end 154 of shank 163 is located longitudinally opposite tee head 158 and, when installed, faces outwardly of outer flange surface 168 (FIG. 16) of angle 104.

Tee head 158 of bolt 144 has outwardly extending portions 158a and 158b (FIG. 12) that extend laterally from semi-square neck 146 for a predetermined total length 158c. As shown in FIGS. 13 and 14, tee head 158 has a substantially smaller width 158d.

The cross section of semi-square neck 146 normal to longitudinal axis 148 of shank 163 (FIGS. 14 and 15) has four equal sides, parallel lateral edges 146a and side edges 146b. Semi-square neck 146 has one set of diagonally opposite corners 146c that are each arcuate and convex with the same angle of curvature, and another set of diagonally opposite square corners 146d, i.e., corners that form a right angle. The cross section of semi-square neck 146 is symmetrical along both lines 149 and 151, which bisect diagonally opposite corners 146c and 146d, respectively, and can also be characterized as having a generally lenticular shape. Angle 153 from longitudinal axis 155 of tee head 158 to line 151, which is the direction of maximum length of the cross section of neck 146, is an acute angle of 45° as measured in angular direction 153 opposite to the clockwise direction 157 (as seen from terminal end 154 of shank 163) of right hand threads 164 of the shank.

The length of neck 146 of bolt 144 taken along longitudinal axis 148 of the bolt is based on proper functional performance for the post 106 (FIG. 16). In the embodiment shown, the length of neck 146 is 0.240" (which is based on proper functional performance for posts 106 ranging in wall thickness between 0.075" and 0.135", with angles 104 having a material thickness of 0.179") so as to be smaller than the combined thicknesses of outer wall 107 of the post and outer flange 105 of angle 104 to which it is connected.

(Particular dimensions given throughout this application are examples for specific embodiments of the invention. They should not be considered as limiting the scope of the invention, as other dimensions may be selected by those skilled in the art without departing from the novel spirit and scope of the invention.)

Serrations 150 (FIGS. 13-15) are of greater hardness than the material in post 106 so they will deform the interior wall 107b (FIG. 16) of the post 106 when the connection is completed, and provide mechanical interlock with the post which maximizes the resistance to slipping under beam load. While orientation marks 152a and 152b are shown as coined dots in the threaded (terminal) end 154, other means equally functional, such as arrows, etc., can be used. The reason for tapered surfaces 156 (FIG. 13) of head 158 of bolt 144, which are inclined inwardly and upwardly of neck 146, is explained below.

Nut 160 is illustrated in FIG. 12. Preferably, nut 160 has some deformed threads 162 near its outer face, or an internal diameter that decreases from one face of the nut to the other, or other means common in the art to require a wrench to turn nut 160 on bolt thread 164 after it has been started. A lock nut may also be used. Serrations 166 (FIG. 12) of nut 160 not only perform the functions of serrated nuts (see U.S. Pat. No. 3,078,899), but also provide mechanical interlock with the outer surface 168 of angle 104 (FIGS. 16-18) to maximize resistance to slipping under beam load.

The configuration of slots 116 and 122 of angles 104 and post 106 will now be discussed. As mentioned before, each slot 116 and 122 is semi-rectangular, as is the knockout 120 that is pushed inwardly into the interior of the tubular post 106 to form the semi-rectangular post slot 122. The term "semi-rectangular" is used to describe a shape that has four sides, sometimes referred to as edges, that include one pair of elongated parallel vertical sides 170 (FIG. 18), that are substantially longer than the sides 146a and 146b (FIGS. 14 and 15) of the cross-section of semi-square neck 146, and one pair of parallel shorter horizontal sides 171 (FIG. 18) that are substantially the same length as, or slightly wider than, the sides 146a and 146b of the cross-section of semi-square neck 146. The curved end portion of each semi-rectangular slot 116 and 122 is complementary in shape to three sides of the cross-section of the semi-square neck 146. In other words, each semi-rectangular slot 116 and 122, as well as each semi-rectangular knockout 120, has sides and corners that are complementary to the edges (sides) 146a and 146b and corners 146c and 146d of semi-square neck 146, i.e., each slot 116 and 122 and knockout 120 has one set of diagonally opposite corners that are each arcuate and convex at the same angle of curvature and another set of diagonally opposite square corners.

The relationship between the slots 116 and 122 and the semi-square neck bolt 144 is important. The relationship is such that the elongated sides 170 (FIG. 18) of each slot 116 and 122 are spaced apart from each other a distance substantially less than the maximum thickness of the semi-square neck 146 measured between diagonally opposite corners 146d of the semi-square neck so that the neck cannot rotate more than 90° in the slots. Elongated sides 170 of each slot 116 and 120 are also spaced apart an amount greater than the width of tee head 158 and greater than the distance between the two planes 157a and 157b (FIGS. 14, 43 and 44) that are parallel to longitudinal axis 155 of tee head 158 and tangent to the cross section of bolt neck 146 that is normal to longitudinal axis 148 of shank 163, to slidably receive edges 146a (FIGS. 14 and 15) of semi-square neck 146 when semi-square bolt 144 is inserted into slots 116 and 122, as shown in FIGS. 39 and 40 and the right-hand portion of FIG. 18, and are spaced apart from each other a distance substantially less than the maximum length of the laterally extending tee head portions 158a and 158b, so that the serrations 150 of tee head 158 interlockingly grasp the inner wall surface 107b of tubular post 106 when tee head 158 is rotated 90° to a position transverse to elongated sides 170 of slots 116 and 122, as shown in FIGS. 41 and 42 and the left-hand portion of FIG. 18. When tee head 158 is rotated 90 degrees, opposite sides 146b (FIGS. 14 and 15) of semi-square neck 146 contact or abut elongated edges 170 of slots 116 and 122. Elongated sides 170 of slots 116 and 122 cooperate with semi-square neck 146 to provide interengaging surfaces that seat with and abut each other after tee head 158 has been rotated 90° to substantially prevent the semi-square neck bolt 144 from thereafter rotating when nut 160 is subsequently tightened.

The arrangement of the parts and components of storage rack 100 is shown in FIGS. 16-18. In order to assemble pallet storage rack 100, the slotdefining knockouts 120 are pushed into the interior 142 of tubular post 106 to define the desired number of post slots 122. The initial steps in the process of connection (shown in the right-hand portions of FIGS. 16 and 18) are alignment of slots 116 of angle 104 and slots 122 of post 106, and the insertion of bolt head 158 just into the interior of the tubular post 106 via the slots thus aligned. Tapered side walls 156 (FIG. 13) on head 158 of bolt 144—which render the cross section of the tee head, in the plane that passes through the longitudinal axis of the bolt shank and is normal to the length of the tee head, narrower at the crown of the tee head than at its base—facilitate this insertion.

Nut 160 is preassembled to bolt 144 prior to the insertion of bolt head 158 into the aligned slots, so that the spacing between nut 160 and head 158 of bolt 144 is greater than the combined material thicknesses of the walls of angle 104 and post 106. In the embodiment shown, this dimension is approximately equal to the sum of the material thicknesses of angle 104 and post 106 plus 3/16".

Turning nut 160 in the clockwise direction without applying sufficient torque to complete the threading of the nut upon the bolt will cause bolt 144 and its tee head 158 to rotate 90° before (as seen on the left-hand side of FIG. 18) semi-square neck 146 of bolt 144 is seated against sides 170 of slots 116 and 122 of angle 104 and post 106, respectively. When semi-square neck 146 is thus seated, bolt 144 is prevented from rotating as the nut is subsequently tightened by applying torque of the necessary minimum magnitude to the nut. Nut 160 may be tightened in this way until angle 104 is secured to post 106.

In the preferred embodiments of the bolt and nut assembly of this invention, the positions of nut 160 upon T-bolt 144 in the final tightened condition and in the preassembled condition, respectively, are achieved by the relationship of the combined thickness of the two members to be secured to (1) the length of semi-square neck 156, and (2) the distance between tee head 158 and nut 160 when the bolt and nut have been pre-assembled and are not yet installed in place.

As seen from FIG. 12, the fact that the length of semi-square neck 146 is preferably less than the predetermined combined thickness of slotted flange 105 of angle 104 and slotted outer wall 107 of post 106 means that nut 160 can be tightened up against the slotted flange to secure it firmly against the slotted outer wall. As indicated above, in the embodiment of FIG. 16 the length of semi-square neck 146 is 0.240" and the combined thickness of slotted flange 105 and slotted outer wall 107 is between 0.254" and 0.314".

With further reference to the embodiment of FIG. 16, it is indicated just above that the spacing between nut 160 and tee head 158 of bolt 144 in their pre-assembled but uninstalled condition is equal to the sum of the combined thickness of angle 104 and post 106 plus 3/16" (or 0.188"). In other words, the difference between (1) the distance between the nut and tee head when the bolt and nut are in their pre-assembled but uninstalled condition, and (2) the combined thickness of the two slotted members, is 0.188", which is less than the length of semi-square neck 146, 0.240", referred to just above.

The indicated relationship of parts means that in the embodiment of FIG. 16, if the nut and bolt pre-assembly is pushed into slots 116 and 122 of angle 104 and post 106 until nut 160 is stopped by flange 105 of the angle, semi-square neck 146 will extend 0.188" beyond the inner side of post 106. Since, as pointed out above, semi-square neck 146 is in this embodiment 0.240" long, when nut 160 is snug against post 106 at least a portion of the semi-square neck (at least about 0.240" minus 0.18841 ) is still located within slot 122 of post 106. As a result, when T-bolt 144 is turned 90°, any further turning of the bolt will be restrained by the sides of slot 116 and/or slot 122.

It follows from this that when the pre-assembled bolt and nut are inserted into the two slotted members to be secured, tee head 158 will be automatically positioned—without any further attention being paid by the person who is using the bolt and nut assembly—just inside post 106. After nut 160 is threaded upon shank 163, the bolt and nut assembly will be inserted within the slots with semi-square neck 146 positioned as described. T-bolt 144 can then be rotated through 90° until it is restrained by elongated sides 170 of the slots, and the nut can with the same motion be tightened up on thread shank 163.

As will be seen from FIGS. 16 and 39, nut 160 may be turned up on threaded shank 163, before the bolt and nut assembly is installed in place, by application of a torque of sufficient magnitude (whatever is required) that it will bring nut 160 within the predetermined desired distance from tee head 158.

With the preferred embodiment of FIG. 12, nut 160 can readily be turned by hand upon threaded shank 163 until deformed threads 162 (which as stated above are near the outer face of the nut) reach the threads of the shank. At this point, the nut is "finger tight" upon threaded shank 163, and nut 160 need not be turned any farther manually. The resulting spacing of nut 160 from tee head 158 that is illustrated in FIG. 12 makes the insertion of the assembled bolt and nut—in the proper condition for applying a mechanical torque, as by means of an impact wrench—very simple, with the turning of bolt 144 thereafter through 90° and the tightening of nut 160 all one simultaneous, quick operation.

As seen in FIGS. 16 (left-hand portion), 17, 31, 33 and 41 (the latter Figures discussed below), when nut 160 has been tightened in place on T-bolt 144, terminal end 154 of shank 163 of the T-bolt preferably extends outward no more than a relatively short distance beyond the outer face of the nut, in order not to present any unnecessary and undesirable protuberances that might interfere with, and even cause injury to, persons who use pallet storage rack 100 after it has been erected. As seen in FIG. 16 (right-hand portion), 37 and 39 (the latter Figures discussed below), when T-bolt 144 and nut 160 have been pre-assembled to form nut and bolt assembly 110 but the nut has not yet been tightened in place, terminal end 154 of bolt shank 163 preferably does not extend outward beyond the nut; in one embodiment shown it is located within the nut a short distance in relation to the thickness of the nut (FIG. 37), and in another it is substantially flush with the outer face of the nut (FIG. 39).

Prior to insertion in the aligned slots as has been described, nut and bolt assembly 110 is positioned so that orientation marks 152a and 152b are in the bolt-inserting position as shown in the right-hand side of FIG. 18. After head 158 of bolt 144 has been rotated 90 degrees in the clockwise direction by a power wrench, the orientation marks take the tee-head locking position shown in the left-hand side of FIG. 18. As is best seen in FIG. 13, this will insure that when the connection has been completed serrations 150 on the underside of head 158 of bolt 144 will be oriented properly for the greatest load-carrying strength attributable to the interaction of the serrated underside 150 of bolt head 158 and post 106.

At rated torque, the friction between clamped surfaces 104 and 106, together with the action of serrations 150 located on bolt 144 and serrations 166 located on nut 160, will in most cases provide rated load-carrying strength for the connection without having to seat beam 102 (in the manner shown on the left-hand side of FIG. 18) with the upper end portion of slot 116 of angle 104 bearing on the upper portion of semi-square neck 146 and the lower portion of neck 146 bearing on the lower end portion of slot 122 of post 106. However, such seating does increase the load-carrying strength of the structure, and fully closes openings 122 in post 106, and will therefore generally be effected for all connections. The principal exception is in the case of special applications where greater adjustability of beam position is required, and in such cases the strength of this connection even without the seating described is usually great enough that no separate locking device is required.

The insertion and 90 degrees turning of bolt 144, followed by the tightening of nut 160, are also illustrated in FIGS. 39–42. In FIG. 39, orientation marks 152a and 152b of preassembled nut and bolt assembly 110 are positioned in the bolt-inserting position preparatory to inserting the tee head 158 into the interior of post 106, via slots 116 and 122. In the bolt-inserting position, the length of tee head 158 is positioned parallel to the elongated sides of slots 116 and 122. During insertion of tee head 158, the opposite sides 146a (FIGS. 14 and 15) of semi-square neck 146 slidably engage the elongated sides of slots 116 and 122 until tee head 158 just enters the interior of tubular post 106 as shown in FIG. 40. Thereafter, turning nut 160 will cause the outwardly extending portions of tee head 158 to rotate 90° to a position transverse to the elongated sides of slots 116 and 122 (FIGS. 41 and 42), and simultaneously cause orientation marks 152a and 152b to move to the tee head locking position (FIG. 41). When tee head 158 is rotated 90°, the opposite edges of the semi-square neck 146 will abut, and seat against, the elongated sides of the slots 116 and 122 as discussed above. Subsequent rotation of nut 160 will cause nut 160 to move towards tee head 158 until it is fully tightened against angle 104.

Figure 23:
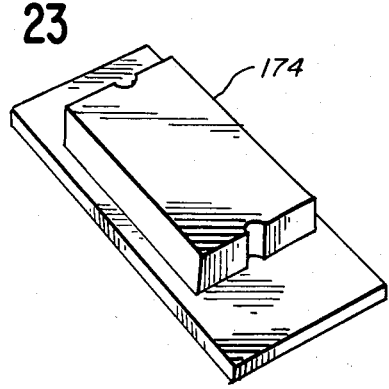
FIG. 23 is a perspective view of another plug for a slot in an upright tubular post of a pallet storage rack.
Figure 28:
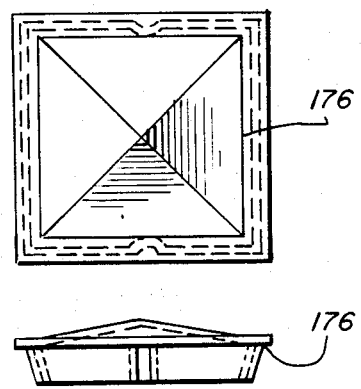
FIG. 28 is a top plan view of the same plug.

If it is desired to relocate a beam after initial erection of the storage rack of this invention, appropriate slots 122 in post 106 are opened by forcing the associated knockouts 120 inward. After relocation of a beam, any open exposed slot may be closed by inserting a friction-held plug 172 or 174 (FIGS. 19–26) of suitable material. Likewise, the open tops of posts 106 may be closed by inserting a plug 176 (FIGS. 27–29 and 38). FIGS. 19–29 illustrate typical plugs 172, 174 and 176 molded from an elastomeric material such as low density polyethylene.

Generally, for connections comparable in strength to the previously described prior art pallet storage racks, two nut and bolt assemblies 110 will be used at each connection. This will require that the angles 104 have two slots 116 and that two post slots 122 are opened at each connection level such as shown in FIGS. 17 and 18.

FIGS. 30 and 31 show that in the storage rack of this invention beam 102 can be adjusted through a range equal to the sum of (1) the vertical length of a post slot 122 and (2) the vertical length of an angle slot 116 minus (3) twice the shortest diameter of the neck of bolt 144. In the embodiment shown in those two figures, the vertical length of each slot 122 in post 106 and of each slot 116 in angle 104 is 2" and the shortest diameter of semi-square neck 146 of bolt 144 is slightly less than ½41. Thus in this embodiment the vertical position of beam 102 for a given set of slots 122 can be adjusted through a range of 3", which as pointed out above is the usual standard increment of adjustability for storage racks of this general type.

In FIG. 30, one beam 102 is shown at the upper end of its range of adjustability on the left-hand side of the drawing and another beam 102 is shown at the lower end of its range of adjustability on the right-hand side of the drawing. In this configuration, it will be seen from FIG. 30 that all post slots 122 are not fully covered by unslotted portions of angle 104; specifically, slot portion 122a is exposed in the left-hand portion of the drawing.

To avoid the problem of possible introduction of dirt or other debris through such exposed openings, the storage rack may include means to provide fully closed post slots 122 with all positions of beam 102. Cover member 178 and washer 180, shown in FIGS. 35–36 and 34, respectively, may be used as shown in FIG. 37. Washer 180 has a semi-square shaped hole 182 that is complementary to and receives semi-square neck 146 of bolt 144. Cover member 178 is large enough to cover the unoccupied portions of the underlying post slots 122 and has vertically aligned rectangular holes 179 to receive semi-square neck 146. Bolt 144, cover 178, washer 180 and nut 160 are pre-assembled to beam angle 104 before making the connection to post 106, so that semi-square neck 146 of bolt 144 cannot withdraw from hole 182 in washer 180 while the connection is being made. Nut 160 is preadjusted for the angle material thickness, which in this embodiment is 3/16".

Preassembly of nut and bolt assembly 110 with cover member 178 and washer 180 is accomplished by first inserting semi-square neck 146 in a hole 179 of cover member 178 and thereafter in the hole 182 in washer 180. Threaded shank 164 is then inserted through slot 116 of angle 104, and then nut 160 is turned on bolt threads 164 until nut 160 and washer 180 are positioned closely adjacent angle 104. Tee head 158 is then inserted through post slots 122 until cover member 178 is positioned against post 106, before the tee head is rotated in the manner described above. This construction adds somewhat to the cost of the storage rack, and therefore will be used only when necessary.

If it is desired to position beams 102 above the position shown in the left-hand side of FIG. 30, the two beams may be repositioned by pushing out the next higher knockout portions 120 and inserting bolts 144 in the resulting, next higher pair of slots 122 for each beam. The lowest position for both beams 102 will then be as shown in phantom in the upper right-hand portion of FIG. 30.

It will be seen that with the slot dimensions of the embodiment of this Figure, there will be a gap "g" where beams 102 cannot be positioned. If it is important that the beams be positionable at all possible heights, this gap may be eliminated by lengthening the vertical dimension of either slots 122 on post 106 or slots 116 on angle 104. In the embodiment of FIGS. 32–33, slots 116 are longer than slots 122, which increases the range of possible vertical movement of both beams 102. As a result, as shown by the phantom outline of beam 102 in the upper right-hand corner of FIG. 32, there is no gap between the uppermost position of left-hand beam 102 when supported by bolts 144 inserted in the pair of slots 122 shown as already open and the lowermost portion of right-hand beam 102 supported by bolts 144 inserted in the next higher pair of slots 122 resulting from pushing out another knockout portion 120 above those now shown.

As shown in FIGS. 32 and 33, cover members 178 may also be used with this embodiment of the storage rack to close off any exposed portions 122a of slots 122 in posts 106.

While semi-square neck bolts and their associated semi-rectangular angle slots, post slots and knockouts as shown in the drawings are particularly useful, it will be appreciated by those skilled in the art that other shapes and configurations of necks, slots and knockouts, can, if desired, be used and made in a similar manner to accomplish similar results without departing from the novel spirit and scope of the invention. Any connector bolt having a cross section normal to the shank axis that meets the dimensional and orientation requirements specified above may be used. In every case, the relation between the slots in the slotted members to be secured by the connector means of this invention and the connector bolt must be such that the bolt neck has a maximum thickness (measured in a direction transverse to the shank axis) that is large enough to prevent the bolt neck from turning freely in the aligned slots, and a minimum thickness (measured generally normal to the first mentioned direction) that is small enough to permit the bolt when properly oriented to be inserted in the aligned slots.

Many other uses of the connector bolt of this invention besides those disclosed above may be utilized. In the embodiments disclosed, for example, the perimeters of the slots in the post and in the angle flange are in substantial registration with each other, and thus in the seating step the neck of the T-shaped bolt and the opposite edges of both of those aligned slots are in abutting engagement. However, it is sufficient if the spacing between opposite edges in only one set of slots, whether in the post or in the angle flange, is substantially less than the maximum thickness of the bolt neck, so that there may be an abutting or seating relationship between the neck of the T-shaped bolt and only one of the post and the angle flange. It is enough if rotation of the bolt neck is stopped by such an engagement, while sufficient torque is applied to the nut to complete tightening the nut upon the bolt.

The structure and one important use of the preferred form of this invention—a T-shaped bolt having a "semi-square" neck as defined—have been explained above in some detail. However, the invention in its broadest form encompasses every T-shaped bolt that includes a neck having a cross section normal to the longitudinal axis of the bolt shank (1) that has a maximum length measured in a first direction intersecting the shank axis, (2) that has a substantially smaller maximum width measured in a second direction intersecting said shank axis and normal to said first direction, (3) in which the angle from the longitudinal axis of the tee head to the first direction just mentioned is an acute angle when said angle is measured in the angular direction opposite to the direction of the shank thread, and (4) in which the distance between the two planes parallel to the longitudinal axis of the tee head and tangent to the bolt neck cross section is substantially less than the tee head length.

Thus, for example, instead of a semi-square neck, the connector bolt of this invention may have a neck 190 with a cross section normal to longitudinal axis 148 of bolt shank 163 that is elliptical in shape (FIG. 43). As another example, it may have a neck 192 having a cross section normal to axis 148 that is diamond-shaped, with one diagonal 194 of the diamond being longer than the other diagonal 196 (FIG. 44).

In all these embodiments, the T-shaped bolt has a cross section with maximum and minimum dimensions and orientation as called for in the broadest definition of this invention. Still other forms of the invention may be practiced so long as the basic limitations of the broadest definition are met.

The preceding detailed description has been given for ease of understanding only. No unnecessary limitations are to be understood therefrom, as modifications will be obvious to those skilled in the art.

What is claimed is:

1. A bolt and nut assembly for use in storage racks and other structures to secure a plurality of slotted members having a predetermined combined thickness, which bolt and nut assembly comprises:

(a) a generally T-shaped bolt, said bolt having a tee head and an elongated shank with threads thereon, said shank having a longitudinal axis and a terminal end located opposite said tee head, said bolt having a neck positioned between and connecting said shank and said tee head, said tee head having portions extending laterally outward from said neck for a predetermined total length and having a substantially smaller width, the cross section of said neck normal to said longitudinal axis of the bolt shank having a maximum length measured in a first direction intersecting said shank axis, and a substantially smaller maximum width measured in a second direction intersecting said shank axis and normal to said first direction, the angle from the longitudinal axis of the tee head to said first direction being an acute angle when said angle is measured in the angular direction opposite to the direction of said shank thread, the distance between the two planes parallel to the longitudinal axis of the tee head and tangent to said bolt neck cross section being substantially less than said predetermined tee head length; and (b) an internally threaded nut, said nut being threadable on said threaded shank to a position in which the distance between said tee head and said nut, minus said predetermined combined thickness of said slotted members, is less than the length of said bolt neck, said nut in said position resisting further threading upon said shank except under application of a torque of at least a predetermined minimum magnitude greater than is applicable by manual twisting.

2. A method of securing two slotted members to each other, said members having a predetermined combined thickness, comprising the steps of;

providing a first member portions of which define at least one slot extending through said member;

providing a second member portions of which define at least one slot extending through said member and corresponding generally in size and shape to said at least one slot in said first member;

providing a generally T-shaped bolt having a tee head and an elongated shank with threads thereon, said shank having a longitudinal axis and a terminal end located opposite said tee head, said bolt having a neck positioned between and connecting said threaded shank to said tee head, said tee head having portions extending laterally outwardly from said neck for a predetermined total length and having a substantially smaller width, the corss section of said neck normal to said longitudinal axis of the bolt shank having a maximum length measured in a first direction intersecting said shank axis, and a substantially smaller maximum width measured in a second direction intersecting said shank axis and normal to said first direction, the angle from the longitudinal axis of the tee head to said first direction being an acute angle when said angle is measured in the angular direction opposite to the direction of said shank thread, the distance between the two planes parallel to the longitudinal axis of the tee head and tangent to said bolt neck cross section being substantially less than said predetermined tee head length, said slots in said first member each having a set of opposite edges that are spaced from each other substantially less than said tee head length, said spacing between said opposite edges of all said slots in said two members being greater than said tee head width and greater than the distance between said two planes tangent to the bolt neck cross section, the spacing between said opposite edges of each slot in at least one of said two members being substantially less than said bolt neck cross section maximum length;

providing an internally threaded nut for threading upon the threaded shank of the bolt;

preassembling the nut and bolt to form a preassembled bolt assembly by turning the nut on the threads of said bolt to a position in which the distance between said tee head and said nut, minus said predetermined combined thickness of said slotted members, is less than the length of said bolt neck, said nut in said position resisting further threading upon said shank except under application of a torque of at least a predetermined minimum magnitude greater than is applicable by manual twisting;

positioning said second member against said first member;

aligning a slot of said second member in general registration with a slot of said first member;

inserting the tee head of said pre-assembled bolt assembly into said aligned slots until said tee head is positioned just beyond said first member;

rotating said tee head so that said laterally extending portions of the tee head are generally transverse to said opposite edges of said slots, in which position said portions extend beyond the edges of the slot in said first member in which the tee head is inserted;

seating said bolt neck against said opposite edges of said slot in at least one of said two members in which the tee head is inserted so that said neck and said opposite edges of said slot are in abutting engagement with each other, while said laterally extending portions of the tee head remain generally transverse to said edges of said slots; and tightening the nut on said bolt until said laterally extending portions of the tee head are pressed tightly against said first member and said second member is thereby secured to said first member while said abutting engagement between said bolt neck and said slot edges substantially prevents said bolt from rotating.

3. The bolt and nut assembly of claim 1 in which said nut is threadable to said position on said shank by manual manipulation.

4. The bolt and nut assembly of claim 3 in which the threads of said nut are deformed near its outer face.

5. The bolt and nut assembly of claim 1 in which the length of said bolt neck along the longitudinal axis of the bolt is no longer than said predetermined combined thickness of said slotted members to be secured.

6. The bolt and nut assembly of claim 5 in which said bolt neck length is less than said predetermined combined thickness of said slotted members.

7. The method of assembly of claim 2 in which said nut is threadable to said position on said shank by manual manipulation.

8. The method of assembly of claim 7 in which the threads of said nut are deformed near its outer face.

9. The method of assembly of claim 2 in which the length of said bolt neck along the longitudinal axis of the bolt is no longer than said predetermined combined thickness of said slotted members to be secured.

10. The method of assembly of claim 9 in which said bolt neck length is less than said predetermined combined thickness of said slotted members.

11. The storage rack of claim 3 in which the threads of said nut are deformed near its outer face.

12. The storage rack of claim 1 in which the length of said bolt neck along the longitudinal axis of the bolt is no longer than said predetermined combined thickness of said slotted members to be secured.

13. The storage rack of claim 12 in which said bolt neck length is less than said predetermined combined thickness of said slotted members.

14. A storage rack, comprising:
an upright post having a cross-sectional shape formed of at least two walls, one of said walls having an outer face with portions thereof defining at least one slot extending through said wall to the inner face of the wall;

a generally horizontal beam having an angle portion, said angle portion having an outer flange positioned against said outer face of said post, said outer flange defining at least one slot aligned in general registration with said slot of said post, said one wall and said outer flange having a predetermined combined thickness;

a generally T-shaped bolt inserted in said aligned slots in said post and said angle flange, said bolt having a tee head positioned against said inner face of said one wall of the upright post and an elongated threaded shank, said shank having a longitudinal axis and a terminal end located opposite said tee head and extending outwardly from said angle flange, said bolt having a neck positioned between and connecting said threaded shank to said tee head, said tee head having an underside engaging said post, having portions extending laterally outwardly from said neck for a predetermined total length and having a substantially smaller width, the cross section of said neck normal to said longitudinal axis of the bolt shank having a maximum length measured in a first direction intersecting said shank axis, and a substantially smaller maximum width measured in a second direction intersecting said shank axis and normal to said first direction being an acute angle when said angle is measuring in the angular direction opposite to the direction of said shank thread, the distance between the two planes parallel to the longitudinal axis of the tee head and tangent to said bolt neck cross section being substantially less than said predetermined tee head length, said slots in the post wall each having a set of opposite edges, said opposite edges being spaced from each other a distance substantially less than said tee head length, said spacing between said opposite edges of all said slots in the post and angle flange being greater than said tee head width and greater than the distance between said two planes tangent to the bolt neck cross section, the spacing between said opposite edges of each slot in at least one of said post wall and said angle flange being substantially less than said bolt neck cross section maximum length, said laterally extending portions of said tee head being positioned generally transverse to said opposite edges of said aligned slots, and said bolt neck abutting against the oppostie edges of the slot in at least one of said post wall and said angle flange; and an internally threaded nut threaded on said T-shaped bolt and tightened against the outer flange of said angle, said nut being threadable on said threaded shank, prior to incorporation of said nut in said storage rack, to a position in which the distance between said tee head and said nut, minus said predetermined combined thickness of said slotted members, is less than the length of said neck, said bolt nut in said position resisting further threading upon said shank except when a torque of at least a predetermined magnitude is applied to the nut that is greater than is applicable by manual twisting.

15. The storage rack of claim 14 in which said nut is threadable to said position on said shank by manual manipulation.

* * * * *